United States Patent
Yamamoto et al.

(10) Patent No.: US 6,192,958 B1
(45) Date of Patent: Feb. 27, 2001

(54) APPARATUS FOR PRODUCING FIBER-REINFORCED RESIN GOLF CLUB SHAFT

(75) Inventors: Shinji Yamamoto; Tetsuya Ishii, both of Hiratsuka (JP)

(73) Assignee: The Yokohama Rubber Co., Ltd., Tokyo (JP)

(*) Notice: Subject to any disclaimer, the term of this patent is extended or adjusted under 35 U.S.C. 154(b) by 0 days.

(21) Appl. No.: 09/215,291

(22) Filed: Dec. 18, 1998

Related U.S. Application Data

(62) Division of application No. 08/760,878, filed on Dec. 9, 1996, now Pat. No. 5,876,544.

(30) Foreign Application Priority Data

Dec. 11, 1995 (JP) ................................. 7-321982

(51) Int. Cl.[7] ........................................... B65H 81/00
(52) U.S. Cl. ........................... 156/432; 156/430; 242/444; 242/445.1
(58) Field of Search ........................ 156/430, 432, 156/171, 175, 169; 242/444, 445.1

(56) References Cited

U.S. PATENT DOCUMENTS

| 2,011,463 | 8/1935 | Vianini . |
|---|---|---|
| 2,843,153 | 7/1958 | Young . |
| 2,862,541 | 12/1958 | Brink . |
| 4,092,194 | * 5/1978 | Green ................. 156/175 X |
| 4,125,423 | 11/1978 | Goldsworty . |
| 4,157,181 | 6/1979 | Cecka . |
| 4,878,984 | * 11/1989 | Bourrieres ............. 156/430 X |
| 4,889,575 | 12/1989 | Roy . |
| 5,215,615 | * 6/1993 | Forsythe ............... 156/175 X |
| 5,265,872 | 11/1993 | Tennent et al. . |
| 5,634,861 | 6/1997 | Yamoto et al. . |

* cited by examiner

Primary Examiner—Jeff Aftergut
(74) Attorney, Agent, or Firm—Finnegan, Henderson, Farabow, Garrett & Dunner, L.L.P.

(57) ABSTRACT

A method and apparatus for producing a golf club shaft made of a fiber-reinforced resin which includes the steps of rotating a shaft substrate made of an uncured fiber-reinforced resin on the axis thereof, moving a plurality of creel stands in parallel in the axial direction of the shaft substrate, and feeding out tapes from a plurality of the creel stands and winding and laminating the tapes simultaneously and spirally on the outermost layer of the shaft substrate for integrally molding them while the rotating speed of the shaft substrate and the moving speed of the creel stands are being controlled simultaneously.

2 Claims, 2 Drawing Sheets

APPARATUS FOR PRODUCING FIBER-REINFORCED RESIN GOLF CLUB SHAFT

This is a division of application Ser. No. 08/760,878, filed Dec. 9, 1996, now U.S. Pat. No. 5,876,544.

BACKGROUND OF THE INVENTION

This invention relates to a method of, and an apparatus for, producing a fiber-reinforced resin golf club shaft. More particularly, this invention relates to a method of, and an apparatus, for producing a fiber-reinforced resin golf club shaft which can carry out continuously, and simultaneously and in one process step an operation of winding a tape made of an organic polymer on the full length of a shaft substrate and an operation of winding a tape on only a part of the shaft substrate.

When the shaft weight of golf club shafts in general is reduced for the same shaft length, a moment using a certain point in the proximity of a grip portion as a support point (or a swing balance) becomes small. Therefore, head speed and controllability of a ball's orbit can be improved, flying distance can be increased and directionality can be stabilized. When the shaft weight is decreased for the same swing balance, the club length can be increased and the head weight can be increased, as well. Therefore, an increase in flying distance can be expected.

However, when the shaft weight is decreased, its strength becomes insufficient. To supplement this insufficiency, partial reinforcement of the shaft must be made. Greater reinforcement is necessary particularly for the tip side (the fitting side of the shaft to the head) which receives the greatest impact force when a ball is hit by the club head. In the case of fiber-reinforced resin golf club shafts, for example, the number of laminate layers of a fiber-reinforced resin sheet is increased on the tip side when the shaft is made.

When the reinforcement structure described above is employed, however, the centroid position of the shaft shifts towards the tip side. Therefore, even when the shaft weight is decreased, the swing balance of the shaft can be hardly reduced. Further, the effect of an increase of the head weight and the effect of an increase of the shaft length cannot be expected, either, at the same swing balance by merely reducing the total weight.

An inventor of the present invention previously filed patent application Ser. No. 08/533,748 (now U.S. Pat. No. 5,634,861) for a shaft having the structure of a fiber-reinforced resin golf club shaft which solves the problems described above. In this golf club shaft, a tape made of an organic polymer is wound only on the distal end portion of the shaft by varying a winding pitch.

When such a fiber-reinforced resin golf club shaft is molded, shape retention of an uncured fiber-reinforced resin, discharge of an excessive resin and volume compression of air are carried out at the time of molding of the shaft. Therefore, a tape wrapping step of winding a heat-shrinkable polymer having good mold releasability on the full length of the shaft is necessary.

According to the prior art method, however, at least two steps, that is, a step of wrapping the tape at the distal end portion and the step of wrapping the tape on the shaft throughout its full length, are necessary, and there remains the problem that the work efficiency and productivity are extremely low.

SUMMARY OF THE INVENTION

It is an object of the present invention to provide a method of, and apparatus for, producing a fiber-reinforced resin gold club shaft which can wind continuously and simultaneously two kinds of tapes in one process step when the tapes are wound on a shaft substrate made of a fiber-reinforced resin.

It is another object of the present invention to provide a method of, and an apparatus for, producing a fiber-reinforced resin golf club shaft which can wind at least one of two kinds of tapes at variable pitches.

To accomplish the object described above, the present invention provides a method for producing a golf club shaft made of a fiber-reinforced resin which comprises the steps of rotating a shaft substrate made of an uncured fiber-reinforced resin about an axis thereof, moving a plurality of creel stands in parallel in the axial direction of the shaft substrate, feeding out tapes from a plurality of the creel stands, and winding and laminating the tapes simultaneously and spirally on the outermost layer of the shaft substrate for integrally molding them while the rotating speed of the shaft substrate and the moving speed of the creel stands are being controlled simultaneously.

When a golf club shaft is produced by such a method, two kinds of tapes can be wound continuously and simultaneously in one process step. According to the method described above, the winding pitch of the tapes can be varied by controlling the moving speed of the creel stands. Therefore, the winding can be carried out efficiently without the necessity for re-setting and exchanging the creel stands that have been necessary in the past.

In the present invention, a reinforcing tape made of an organic polymer and a shape-retaining tape made of a heat-shrinkable polymer are preferably used as the plurality of tapes described above. The combination of such tapes makes it possible to simultaneously carry out the winding step of the tape constituting a reinforcement layer and the winding step of the shape-retaining tape. In this case, the reinforcing tape needs be wound in only the distal end region of the shaft substrate which requires reinforcement, while the shape-retaining tape may be wound on the shaft substrate throughout its full length. When the moving speed of the creel stand for the reinforcing tape is gradually decreased from the rear end side of the shaft substrate towards its distal end, the thickness of the reinforcement layer can be made smaller on the rear end side of the shaft substrate and greater on the distal end side.

On the other hand, a production apparatus for producing a fiber-reinforced resin golf club shaft according to the present invention for accomplishing the objects described above comprises a support shaft for supporting a cylindrical shaft substrate molded from an uncured fiber-reinforced resin, a driving motor for driving and rotating the support shaft, a feed screw disposed in parallel with the support shaft, another driving motor for driving and rotating the feed screw, which motor is different from the driving motor described above, a plurality of nuts meshing with the feed screw, creel stands for tapes made of organic polymers, supported by the nuts, respectively, still another driving motor for driving and rotating a part of a plurality of the nuts, which driving motor is different from the two driving motors described above, and a controller for controlling the rotating speed of each of the driving motors. In this case, it is preferred that the two nuts are provided, one of the nuts supports the creel stand for a shape-retaining tape made of a heat-shrinkable organic polymer, the other nut supports the creel stand for a reinforcing tape made of an organic polymer having high strength and high elastic modulus, and the nut supporting the reinforcing tape is driven and rotated by the driving motor.

Further, a production apparatus of a fiber-reinforced resin golf club shaft according to the present invention comprises a support shaft for supporting a cylindrical shaft substrate molded from an uncured fiber-reinforced resin, a driving motor for driving and rotating the support shaft, a plurality of feed screws disposed in parallel with the support shaft, a plurality of driving motors for individually driving and rotating a plurality of feed screws, each being different from the driving motor described above, a plurality of nuts each meshing with each of a plurality of the feed screws, a plurality of creel stands for tapes made of organic polymers, supported by a plurality of the nuts, respectively, and a controller for controlling the rotating speed of each of the driving motors. In this case, it is preferred that two feed screws are provided, the nut meshing with one of the feed screws supports the creel stand for a shape-retaining tape made of a heat-shrinkable organic polymer, and the nut meshing with the other of the feed screws supports the creel stand for a reinforcing tape made of an organic polymer having high strength and high elastic modulus.

According to the production apparatus for producing a fiber-reinforced resin golf club shaft described above, the production method of the present invention can be practised by suitably controlling each driving motor by the controller.

DESCRIPTION OF THE PREFERRED EMBODIMENTS

Figure 4:
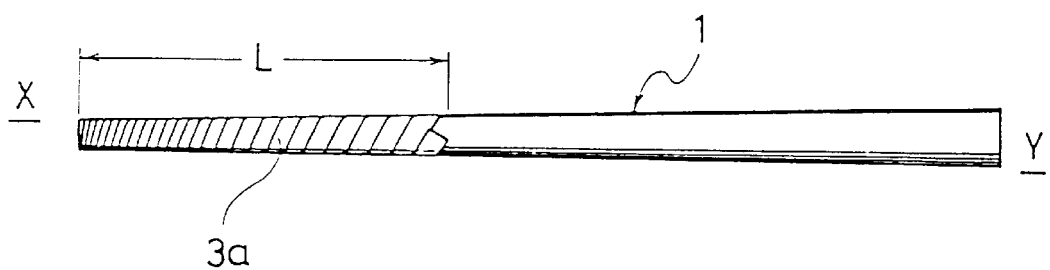
FIG. 4 is a front view of a golf club shaft made of a fiber-reinforced resin produced by a winding apparatus according to the first embodiment of the present invention.
Figure 5:
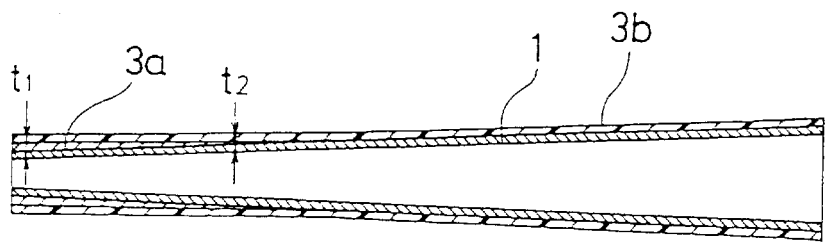
FIG. 5 is a partial enlarged sectional view showing the state where a tape is wound and laminated on a part of a shaft substrate.

First of all, a golf club shaft produced by the present invention will be explained. As shown in FIGS. 4 and 5, a cylindrical shaft substrate 1 is constituted by laminating a sheet-like prepreg impregnated with an uncured resin. Fiber-reinforced resin sheets of a carbon fiber, a boron fiber, a glass fiber, an aramide fiber, an alumina fiber, a silicon carbide fiber, a tirano fiber, an amorphous fiber, etc, are used for this shaft substrate 1. A reinforcing tape 3a made of an organic polymer having a high strength and a high elastic modulus such as an aramide is wound and laminated on a reinforcement zone L in a distal end area on the tip side X of the shaft substrate 1 as an integral unit. A shape-retaining tape 3b made of a thermo-shrinkable organic polymer such as a polyester on a polypropylene is then wound on the outside of the uncured shaft substrate 1 and reinforcing tape 3a. This shape-retaining tape 3b is peeled off after a curing treatment.

In order to achieve effective reinforcement without increasing the weight, the reinforcement zone L of the reinforcing tape 3a is set so as to start at the tip end and to end up at a point having a distance of 150 to 500 mm when the tip end of the shaft substrate 1 is set to 0. The thickness $t_2$ of this reinforcing tape 3a is not greater than 0.05 mm at a point 50 mm towards the tip side from a point closest to the butt side Y of the reinforcement zone L, and the thickness $t_1$ of the reinforcement layer made from the reinforcing tape 3a is at least 0.1 mm in the zone from the tip end to a point 50 mm from the tip end of the reinforcement zone L.

Figure 1:
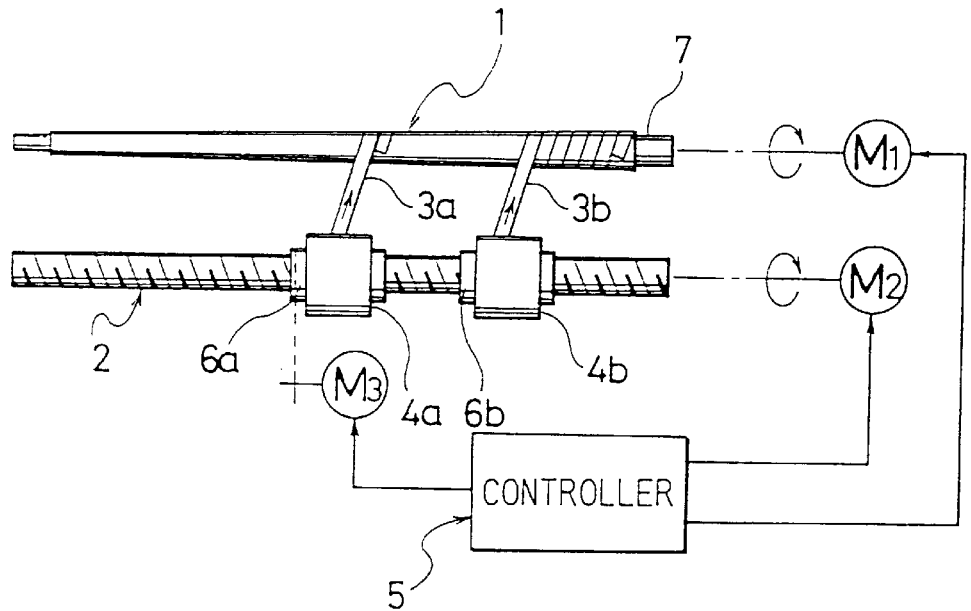
FIG. 1 is a schematic structural view of an apparatus for producing a golf club shaft according to a first embodiment of the present invention.

FIG. 1 is a schematic structural view of a an apparatus according to the first embodiment of the present invention. In this drawing, the cylindrical shaft substrate 1 made of the uncured fiber-reinforced resin is shown supported by a support shaft 7. This support shaft 7 is driven for rotation by a driving motor M1. A feed screw 2 is disposed in parallel with the support shaft 7 and is driven for rotation by a driving motor M2. Threaded nuts 6a and 6b mesh with the feed screw 2 and support creel stands 4a and 4b, respectively. A reinforcing tape 3a and a shape-retaining tape 3b each made of an organic polymer are wound on the creel stands 4a and 4b, respectively, and the tapes 3a and 3b are fed in accordance with the revolution of the shaft substrate 1. The nut 6a for supporting the creel stand 4a of the reinforcing tape 3a is rotated by still another driving motor M3 relative to the feed screw 2. The rotating speeds of these driving motors M1, M2, and M3 are controlled by a controller 5. In other words, the driving motor M1 for the support shaft 7 and the driving motor M2 for the feed screw 2 are so controlled as to always rotate synchronously at a constant ratio, and control is made by changing the ratio of the rotating speed of the driving motor M2 for the feed screw 2 to the rotating speed of the driving motor M3 for the nut 6a.

When, for example, the reinforcing tape 3a is wound at a variable pitch a round the shaft substrate 1, the control calculation system by the controller 5 described above can be executed in the following way.

Figure 3:
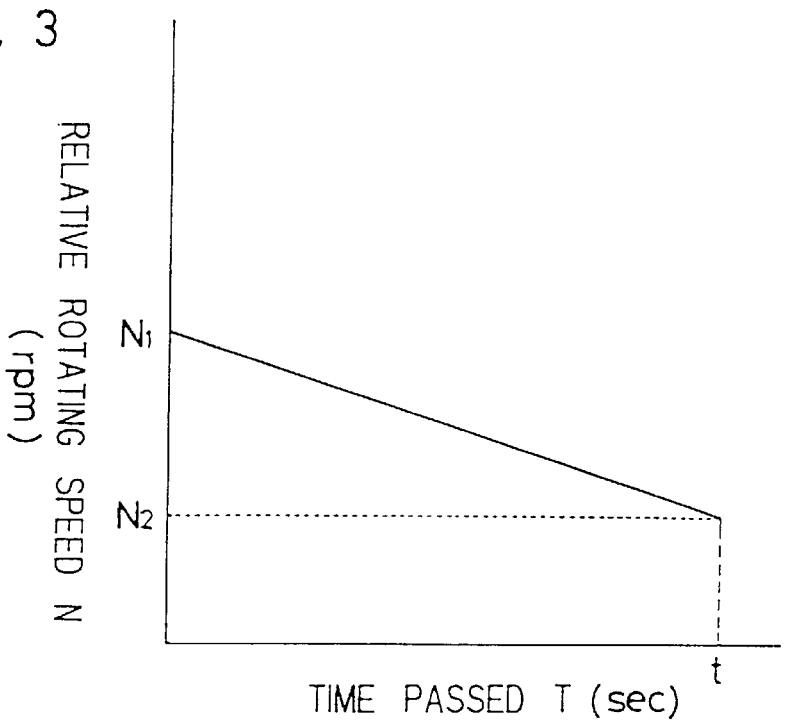
FIG. 3 is an explanatory view showing a relative rotating speed of a nut to a feed screw.

FIG. 3 shows the relationship between the time passed T from the shaft of winding and the relative rotating speed N of the nut 6a to the feed screw 2. Incidentally, symbol t represents a set time from the shaft till the end of winding (cycle). In FIG. 3, when the relative rotating speed N deceases, the winding pitch of the reinforcing tape 3a decreases, too. On the other hand, the winding pitch of the shape-retaining tape 3b remains constant. At this time, assuming that the lead of the feed screw 2 is P and the relative rotating speeds of the nut 6a at the start and the end of winding are $N_1$ and $N_2$, respectively, the relative rotating speed N of the nut 6a and its moving distance L can be expressed as follows:

$$N = (N_2 - N_1)T/t + N_1 \qquad (1)$$

$$L = N_2 \times P \times t \times 1/60 + (N_1 - N_2) \times P \times t \times 1/60 \times 1/2 \qquad (2)$$
$$= Pt(N_2 + N_1)/120$$

From (2), $$t = 120L/P(N_1+N_2) \qquad (3)$$

From (1)+(3), $$N=(N_2-N_1)(N_2+N_1)TP/120L+N_1 \qquad (4)$$

Assuming that the actual rotating speeds of the nut 6a at the relative rotating speeds N, $N_1$ and $N_2$ of the nut 6a to the feed screw 2 are $N_N$, $N_{N1}$ and $N_{N2}$ and the rotating speed (constant) of the feed screw 2 is $N_3$, the relations $N=N_N+N_3$, $N_2=N_{N2}+N_3$ and $N_1=N_{N1}+N_3$ are established. Therefore, when these relations are substituted for (4), the actual rotating speed $N_N$ of the nut $6a$ can be expressed as follows:

$$N_N=(N_{N2}-N_{N1})(N_{N2}+N_{N2}+2N_3)TP/120L+N_{N1} \quad (5)$$

In the equation (5) given above, the moving distance L of the nut $6a$ and its rotating speeds $N_{N1}$ and $N_{N2}$ are inputted from digital switches of an operation board so that the controller 5 can calculate the equation (5) at a predetermined time interval and inputs each result $N_N$ to the driving motor $M_3$. Incidentally, it is also possible to input the winding pitch of the reinforcing tape $3a$ and to convert the pitches to the rotating speed of the nut $6a$ in place of the rotating speeds $N_{N1}$ and $N_{N2}$ of the nut $6a$.

Next, a method for producing a shaft for fiber-reinforced resin golf club by the apparatus described above will be explained.

First, the starting points of the reinforcing tape $3a$ and the shape-retaining tape $3b$ on the shaft substrate 1 are set and then the shaft substrate 1 is rotated about its axis and at the same time, the creel stands $4a$ and $4b$ are moved in parallel in the axial direction of the shaft substrate 1. While the rotating speed of the shaft substrate 1 and the moving speed of the creel stands $4a$ and $4b$ are simultaneously controlled by controlling the rotating speeds of the driving motors $M_1$, $M_2$ and $M_3$ by the controller 5, the tapes $3a$ and $3b$ are fed out from the creel stands $4a$ and $4b$, respectively. In this way, the reinforcing tape $3a$ and the shape-retaining tape $3b$ are wound and laminated spirally and simultaneously on the outermost layer of the shaft substrate 1.

When the golf club shaft is produced by such a method, two kinds of tapes, i.e., a reinforcing tape $3a$ and a shape-retaining tape $3b$, can be wound continuously and simultaneously in one step.

When a golf club shaft having partially different thickness in the reinforcing layer thereof is to be made by using the apparatus described above, the thickness of the reinforcing layer can be made small at the rear end of the shaft substrate 1, and greater at the distal end by gradually decreasing the moving speed of the creel stand $4a$ for the reinforcing tape $3a$ from the rear end side of the shaft substrate 1 towards its distal end. The winding pitch of the reinforcing tape $3a$ is changed in accordance with the thickness and width of the tape $3a$, its winding length and with the taper angle of the shaft substrate 1 before winding. When, for example, the taper angle of the shaft substrate 1 is $6/1,000$ to $15/1,000$ for a reinforcing tape $3a$ having a thickness of 16 $\mu$ and a width of 15 mm that has been used, the winding pitch must be continuously changed between 4.8 and 2.4 mm for a winding length of 500 mm. When the thickness of the reinforcing tape $3a$ is $10\mu$, the winding pitch must be continuously changed between 3.5 and 1.5 mm, and when the thickness is $25\mu$, the winding pitch must be continuously changed between 9 and 3.75 mm.

To prevent the uncured fiber-reinforced resin layer from being twisted by the tension of the tape when the reinforcing tape $3a$ is being wound on it, winding of both the reinforcing tape $3a$ and the shape-retaining tape $3b$ is preferably carried out substantially simultaneously with each other. The first embodiment of the present invention makes it possible to conduct this simultaneous winding by moving the creel stand $4a$ for the reinforcing tape $3a$ and the creel stand $4b$ for the shape-retaining tape along the feed screw 2 under control of the controller 5.

In the present invention, the elastic modulus of the reinforcing tape $3a$ is higher than that of heat-shrinkable films such as polyester, polypropylene, etc, which are used as a wrapping tape, at the time of normal molding. Therefore, when a reinforcing tape $3a$ made of the organic polymer is partially used for the shaft substrate 1, a tension of at least 45 Newtons (when thickness is $16\mu$ and width is 15 mm) is necessary so that the tape can be wound and laminated on the taper-like shaft in close contact therewith without generating creases. Further, this tension must be changed in accordance with the change of the thickness and the width of the reinforcing tape $3a$.

When the tension is smaller than 45 Newtons, elongation is so small that the film is likely to crease and air is likely to be entrapped between the tape-like films. In consequence, a drop in strength occurs and appearance is deteriorated, as well. On the other hand, when the tension becomes excessive and beyond 90 Newtons, or when the fastening force becomes too great as the film is tightly wound in superposition, a ditch-like step is likely to occur at the boundary of the reinforcement zone due to the influences of thermal shrinkage or disturbance is likely to occur in the orientation of the fiber. Therefore, stress concentration locally occurs and the strength of this portion is likely to drop.

Figure 2:
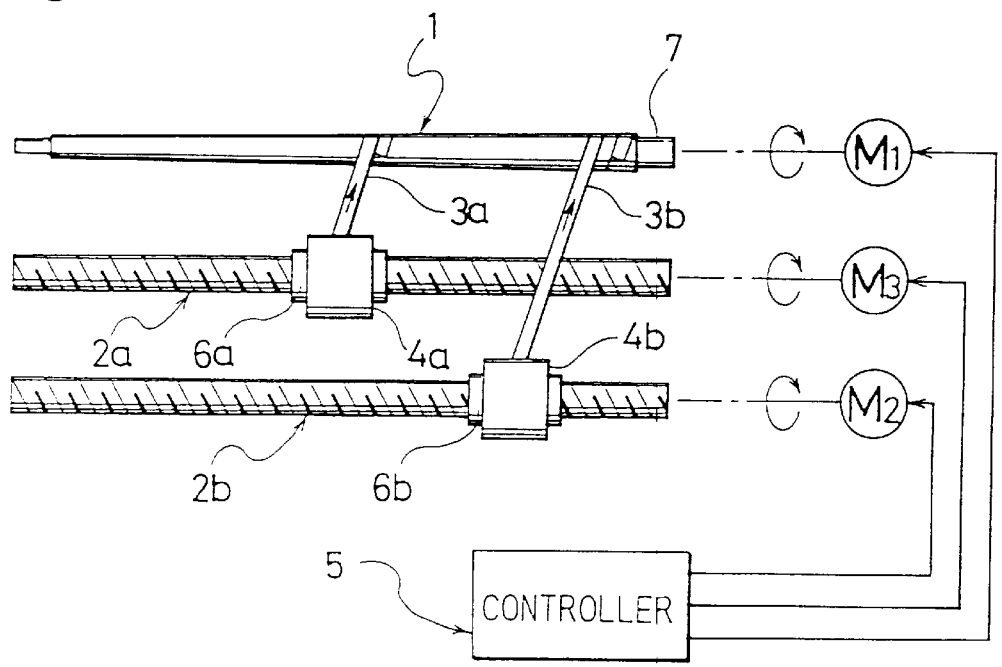
FIG. 2 is an schematic structural view of a apparatus for producing a golf club shaft according to a second embodiment of the present invention.

FIG. 2 shows a second embodiment of the winding apparatus. In this drawing, the feed screws $2a$ and $2b$ are shown disposed in parallel with the support shaft 7, and are individually driven for rotation by the driving motors $M_3$ and $M_2$, respectively. The nuts $6a$ and $6b$ mesh with the feed screws $2a$ and $2b$, respectively, and support the creel stands $4a$ and $4b$, respectively. The reinforcing tape $3a$ and the shape-retaining tape $3b$ are wound on the creel stands $4a$ and $4b$, respectively. The rotating speeds of the driving motors $M_1$, $M_2$ and $M_3$ are controlled by the controller 5.

When the tapes $3a$ and $3b$ are wound continuously on the shaft substrate 1 or when the winding pitch is changed or when the tapes are wound only on a part of the shaft substrate 1 by using the apparatus according to this embodiment, the operations are carried out in the same way as in the first embodiment. In other words, the tapes $3a$ and $3b$ are fed out from the creel stands $4a$ and $4b$ held on the feed screws $2a$ and $2b$, respectively, to the shaft main body 1 which is driven for rotation, and while the rotating speed of the shaft substrate 1 and the rotating speed of the feed screws $2a$ and $2b$ are simultaneously controlled by the controller 5, a plurality of tapes $3a$ and $3b$ are simultaneously wound and laminated. Incidentally, the other construction and function are the same as those of the first embodiment. Therefore, like reference numerals are put to like constituents, and the explanation will be omitted.

As described above, the present invention can wind continuously and simultaneously two kinds of tapes in one step and can moreover change the winding pitch of the tape. Therefore, because the winding operation can be carried out efficiently without the need for resetting or for exchanging of the creel stands, the present invention can improve the working efficiency and productivity.

What is claimed is:

1. Apparatus for producing a fiber-reinforced resin golf club shaft comprising:

a support shaft for supporting a cylindrical shaft substrate molded from an uncured fiber-reinforced resin;

a first driving motor for driving and rotating said support shaft;

a feed screw disposed in parallel with said support shaft;

a second driving motor for driving and rotating said feed screw that is independent from said first driving motor;

a plurality of nuts meshing with said feed screw;

creel stands for tapes made of organic polymers, supported by said nuts, respectively;

a third driving motor for driving and rotating one of said plurality of nuts that is independent from said first and second driving motors; and a controller for controlling the rotating speed of each of said driving motors.

2. The apparatus for producing a fiber-reinforced resin golf club shaft according to claim 1, wherein two of said nuts are provided, one of said nuts supports said creel stand for supporting a shape-retaining tape made of a heat-shrinkable organic polymer, the other of said nuts supports said creel stand for a reinforcing tape made of an organic polymer having high strength and high elastic modulus, and said nut supporting the creel stand for the reinforcing tape is driven and rotated by said third driving motor.

* * * * *